(12) United States Patent
Lee et al.

(10) Patent No.: US 10,365,376 B2
(45) Date of Patent: Jul. 30, 2019

(54) PROTECTED POSITIONING, NAVIGATION, OR TIMING SIGNALS RESISTANT TO SPOOFING

(71) Applicant: iPosi, Inc., Denver, CO (US)

(72) Inventors: Richard M. Lee, Denver, CO (US); Eric Derbez, Vancouver (CA); Christopher Neil Kurby, Streamwood, IL (US)

(73) Assignee: iPosi, Inc., Denver, CO (US)

( * ) Notice: Subject to any disclaimer, the term of this patent is extended or adjusted under 35 U.S.C. 154(b) by 0 days.

(21) Appl. No.: 15/962,935

(22) Filed: Apr. 25, 2018

(65) Prior Publication Data

US 2018/0356529 A1 Dec. 13, 2018

Related U.S. Application Data (60) Provisional application No. 62/489,755, filed on Apr. 25, 2017.

(51) Int. Cl.
*G01S 19/21* (2010.01)
*G01S 1/04* (2006.01)
*G01S 1/24* (2006.01)

(52) U.S. Cl.
CPC ............. *G01S 19/215* (2013.01); *G01S 1/04* (2013.01); *G01S 1/24* (2013.01)

(58) Field of Classification Search
CPC ............. G01S 19/215; G01S 1/04; G01S 1/24
USPC .......................................................... 342/16
See application file for complete search history.

(56) References Cited

U.S. PATENT DOCUMENTS

2013/0293415 A1* 11/2013 Gutt ................. G01S 19/40
342/357.25

* cited by examiner

*Primary Examiner* — Timothy A Brainard
(74) *Attorney, Agent, or Firm* — Holzer Patel Drennan (57) ABSTRACT

Positioning, navigation, and timing ("PNT") signals, such as those used in GNSS or LORAN systems, may be vulnerable to spoofing attacks. To generate trustworthy time and location data at a receiver, one must at least reduce the likelihood of or be capable of detecting spoofing attacks. Embodiments of the present invention, as presented herein, provide solutions for detecting spoofing of PNT signals. Various aspects incorporated into the described embodiments which assist in detecting spoofing attacks may include but are not limited to: monitoring the SNR of received PNT signals of a first modality and switching over to an alternate PNT modality when an anomaly is detected, comparing data associated with signals of multiple PNT modalities to identify a discrepancy indicative of spoofing on one of the multiple PNT modalities, and implementing a security regime to prevent spoofers from being able to produce perceivably authentic, but corrupt, replica signals of a PNT modality.

9 Claims, 7 Drawing Sheets

PROTECTED POSITIONING, NAVIGATION, OR TIMING SIGNALS RESISTANT TO SPOOFING

RELATED APPLICATIONS

This application is a non-provisional of and claims priority to U.S. Application No. 62/489,755 entitled "PROTECTED POSITIONING, NAVIGATION, OR TIMING SIGNALS RESISTANT TO SPOOFING", which was filed on Apr. 25, 2017, the entirely of which is incorporated by reference herein.

TECHNICAL FIELD

This disclosure generally relates to methods for detecting spoofing attacks of position, navigation, or timing signals and securing such signals.

GLOSSARY

AGC automatic gain control
ASF additional secondary factors
dB decibel
DME Distance Measuring Equipment
eLORAN enhanced Long Range Navigation
GNSS global navigation by satellite system
GPS Global Position System, and part of GNSS
LDC LORAN Data Channel
LORAN Long Range Navigation
LPI Low probability of intercept
ms milliseconds
PNT positioning, navigation, or timing
RF radio frequency
SNR signal to noise ratio
TTC Trusted Time Channel
TTL Trusted Time and Location

BACKGROUND

A number of technologies exist that allow for a receiver to determine position, navigation, or timing (PNT) data from broadcasted radio signals. Examples of PNT technologies include GNSS (e.g., GPS), DME, and LORAN (e.g., including any potential implementation of LORAN including eLORAN, LORAN-C), among others. Such systems often broadcast "open" signals, meaning those that are publically accessible and able to be understood by common receivers. GPS provides an example of such open signals in that the U.S. government publishes technical documentation that allows public use of the GPS to determine PNT data with an appropriate receiver.

The use of PNT data may facilitate a number of important applications. For instance, use of PNT signals may allow for determination of a location of a user in the case of an emergency. Moreover, PNT systems may assist in navigation of ships, airplanes, automobiles, etc. or may provide an accurate time to I.T. systems. Further still PNT data may be used for timing applications such as synchronization. For instance, network synchronization (e.g., including cellular backhaul networks or the like) may utilize aspects of PNT for timing so as to enable network communication. Given the criticality surrounding the use of PNT data, establishing trusted time and/or location for PNT solutions derived from broadcast signals is critical for the safety and reliability of these systems.

SUMMARY

Unfortunately, unscrupulous individuals may wish to compromise the safety and reliability of open PNT systems. Examples of such attempted hacks may be to jam PNT systems or spoof PNT signals in an effort to compromise the systems, and in some cases, impart false data which may lead to inauthentic PNT solutions.

Jamming of signals typically involves introduction of noise such that a sufficient SNR cannot be obtained at a receiver for acquisition of a PNT signal. However, PNT receivers can generally detect an attempt to jam open PNT signals. Moreover, in a multi-mode system (e.g., one in which a receiver or device is capable of receipt of multiple modalities of PNT signals, for example, GNSS, LORAN, or DME), it is often difficult to provide sufficient jamming signal power across a wide enough spectrum to successfully jam all open PNT signals.

In contrast, spoofing attacks may be more insidious, thus potentially posing greater danger as it may not be obvious or detectable that a PNT system has been compromised. Spoofers attack a victim receiver to overtake and subsequently change the PNT data generated by the receiver to a convincing but altered state without detection. That is, receivers are often unable to recognize a spoofing attack. Spoofing attacks typically involve receipt and replication of an authentic open PNT signal. That is, a spoofed signal (from which false PNT data is generated) is usually not introduced suddenly because the abrupt change in PNT data may be detectable by a receiver. Rather, a spoofer typically will receive an open PNT signal, replicate it, and gradually introduce it to create a spoofed signal. A spoofed signal may be transmitted such that it is received at only a slightly higher signal power level than the signal power level of the open signal. That is, to successfully spoof a PNT signal, the malicious spoofer must introduce (by intercepting and re-broadcasting) a truthful replica of the authentic PNT signal, and then slowly migrate its transmission to a corrupt (but perceivably credible) replica of the authentic signal by sufficiently increasing the power amplitude to overtake the amplitudes of authentic signals. This allows a spoofer to steer the tracking of the PNT receiver gradually away from the truthful PNT signal to a corrupt replica PNT signal. In this regard, the receiver-generated PNT data are corrupted by the false information contained in a replica PNT signal generated by a spoofer. Further, because a spoofing attack may result in corruption of the PNT data generated by a receiver without the attack being detected, the reliability or trustworthiness of the receiver may be compromised. The spoofing can be simple if the idea is to warp time, in this case all the spoofing signals are the same as the original but shifted in time. If they want to spoof location then they must change some of the navigation data like the SV positions which is easier to detect.

Anti-spoofing strategies may rely on internal automatic gain control (AGC) monitoring to detect the presence of a spoofing attack. This approach attempts to restrict the margin of signal power in which a spoofer may introduce a counterfeit PNT signal. As discussed above, in order to be successful a spoofed PNT signal must be transmitted such that the signal, when received by the receiver, is above the signal power level of the authentic PNT signal being spoofed but below a threshold at which the receiver may detect the attack. Many PNT systems tend to have relatively uniform or predictable signal power levels. For instance, for receivers whose antenna locations are known or for receivers with uninterrupted, line of sight reception of signals, the anticipated received power of a signal may be accurately calculated. Accordingly, in a well-designed spoofing attack, the spoofed signal's power level at the receiver may initially be only marginally above the authentic signal's power and below the receiver's detection threshold. As such, spoofed signals that fall within this range of signal power cannot be reliably detected by AGC techniques because the change may not be significant enough to trigger AGC monitoring limits.

In addition, categories of receivers with assistance (e.g., those receiving supplemental data via an internet connection or the like) and/or high sensitivity (e.g., those able to acquire and track relatively weak signals) also may not be able to rely on this signal amplitude sensing approach. Such high sensitivity receivers are often located indoors or in other environments in which PNT signals are highly attenuated and power levels may be difficult to predict. Therefore, it may not be possible to achieve a reliable estimate of a signal's power level needed to facilitate AGC monitoring-type spoofing detection. Therefore, assurance of trustworthy PNT data remains elusive.

Open radio navigation signals from either satellite or terrestrial transmitters suffer from the same flaw—the open nature of such signals tacitly enables spoofers to replicate a signal and "capture" a victim receiver, as discussed above. If a receiver is susceptible to this process, it is conditionally untrustworthy as such attacks may not be reliably detected and a user may unwittingly continue to rely upon a receiver during an attack. However, the nature of open radio navigation makes such signals useful as the platform is generally open for universal access to the signals available.

To generate trustworthy time and location data at a receiver, one must at least reduce the likelihood of or be capable of detecting spoofing attacks. Embodiments of the present invention, as presented herein, provide solutions for detecting spoofing of PNT signals. Various aspects incorporated into the described embodiments which assist in detecting spoofing attacks may include but are not limited to: monitoring the SNR of received PNT signals of a first modality and switching over to an alternate PNT modality when an anomaly is detected, comparing data associated with signals of multiple PNT modalities to identify a discrepancy indicative of spoofing on one of the multiple PNT modalities, and implementing a security regime to prevent spoofers from being able to produce perceivably authentic, but corrupt, replica signals of a PNT modality.

As utilized herein, PNT refers generally to any position, navigation, or time information that may be derived from a signal, which may be referred to as a PNT signal. It may be appreciated that in various contexts, each of position, navigation, and time signals may not be utilized. For instance, certain PNT receivers may rely on reception of PNT signals solely for purposes of generating information regarding time. In contrast, other PNT receivers may rely solely on reception of PNT signals for determination of position or location of the PNT receiver. Further still, various PNT receivers may rely on PNT signals for combinations of data types such as, for example, deriving position or location and time. Moreover, as described herein, different PNT "modalities" are referred to. These modalities reference different various protocols used for deriving PNT data. For instance, each of GNSS, LORAN, and DME each refer to different respective modalities that rely on different, unique protocols for generation PNT data.

In at least one aspect, the present disclosure may leverage known or measurable characteristics of a receiver (e.g., a hidden receiver) to augment traditional AGC techniques. For instance, a receiver or other device at the receiver location may be operative to perform tomographic loss estimation such as that described in U.S. application Ser. No. 14/798,611, which is incorporated by reference herein in its entirety. Other techniques for detecting an attenuation profile relative to a receiver may also be used such as, for example, a comparative study in relation to attenuation levels for various PNT modalities at a common receiver location. In any regard, an attenuation profile relative to a receiver may be used to provide heightened control over AGC monitoring in scenarios in which anticipated signal levels are otherwise difficult to obtain. In this regard, even for PNT receivers with initially unknown anticipated signal levels, AGC monitoring may be more accurately determined by deriving AGC monitoring levels in consideration of the attenuation profile relative to the receiver.

Further still, in this aspect of the disclosure, a PNT receiver in a location with multiple PNT modalities may determine a suspect signal level for a PNT modality even if an attenuation profile for that particular PNT modality has not been determined. For instance, in steady state operation, it may be possible to determine an attenuation loss profile for a GNSS receiver at a given location. In this steady state scenario, a comparison of the steady state GNSS signal strength in view of the attenuation profile may be determined. This GNSS signal strength may be compared to a LORAN signal strength. In turn, variation between the relative characteristics of the GNSS signal and the LORAN signal may allow for detection of suspect or fraudulent GNSS signals or LORAN signals based on the relative comparison. Advantageously, this relative comparison may allow for an attack to be detectable such that PNT trust may be determined. That is, in the context of a corrupted PNT signal, the PNT receiver may detect the degradation of trustworthiness and report the same to, for example, provide an indication that the PNT data generated by the PNT receiver is not to be trusted, allow authorities to be contacted, or allow for an alternative PNT modality to be utilized to regain trustworthiness.

Accordingly in other aspects, the present disclosure may include a receiver capable of receiving signals from at least two modalities such as GNSS, LORAN, DME, or the like. Such a multi-mode receiver may primarily rely upon data associated with signals of one PNT modality, but may switch to data associated with signals from another PNT modality upon indication that the first data may be corrupt (e.g., from spoofing). In order to detect such corruption, a receiver may monitor the SNR of at least one signal of one of the modalities. An irregular increase in SNR may indicate an attack as a spoofer increases the magnitude of a replica signal in an attempt to steer the receiver away from the authentic signal, as described above. In existing receivers, an attack may cause the receiver to simply cease operations. In contrast, a multi-mode receiver of the present invention may default to another PNT modality and continue operating. The alternative PNT modality may or may not have independent trustworthiness (e.g., utilizing single modality trustworthiness approaches described in greater detail below).

Any of the modalities of a multi-mode receiver may operate with either outdoor or indoor antennae. In certain antennae configurations, signals may be of a known or predictable signal strength. For example, in outdoor contexts, GNSS signals commonly have a known or predictable strength associated with the straight-line distance between the transmitter and receiver, as well as known atmospheric conditions. In the context of indoor receivers which may experience inconsistent signal strengths, an attenuation profile of a signal may have been previously determined and recorded such that an estimated signal strength value may be predicted which accounts for delays, reflections, etc. caused by the local environment in which the antenna is disposed (e.g., walls, floors, furniture, etc. may reduce signal strength). Over time, a receiver may compute its location and also determine the attenuation profile of the building or other environment containing the receiver. That is to say, for almost all azimuths and elevations, a loss or reduction of a signal due to surrounding materials may be computed and recorded. See, for example, U.S. patent application Ser. No. 15/130,290 entitled USING LORAN FOR TERRESTRIAL TIME TRANSFER and U.S. patent application Ser. No. 14/798,611 entitled TOMOGRAPHIC LOSS FACTOR ESTIMATION, both of which are incorporated by reference herein in their entirety. Deviations due to a spoofing attack may be detectable due to a variance between the estimated signal strength value associated with the attenuation profile and actual signal strength of a received signal. Additionally or alternatively, a relative comparison between two PNT modalities may occur. In this regard, any deviation from historic or steady state comparisons between the modalities may indicate a reduction in trustworthiness. In this regard, the attenuation profile may be unknown to a party that may attempt to spoof the receiver and therefore the party may be unable to successfully replicate an authentic signal's strength, much less successfully replicate two authentic signals of different PNT modalities with the correct relative strength variations.

A multi-mode PNT receiver may monitor differences between data generated from, for example, GNSS signals and data generated from LORAN signals to create a record of biases (e.g., ASF's) which arise from time delays along the terrestrial path(s) between a LORAN station and a PNT receiver under varying conditions (e.g., weather). ASFs may be used to compensate for time delays which occur when terrain, weather, ground moisture, snow etc. cause a signal to take additional or less time to traverse a path due to varying conductivities of the path mediums as compared to a homogenous media such as uniform salinity sea water. In this regard, a known difference between historical GNSS solutions and historical LORAN solutions may be used to adjust a current LORAN solution when a GNSS spoofing attack has been detected such that a solution calculated from LORAN may be calibrated for current conditions.

A multi-mode PNT receiver may also be able to detect spoofing attacks by monitoring common mode biases. A change in a common mode bias may be indicative of a spoofing attack because a targeted attack may cause a magnitude of change in signal strength that is not simultaneously occurring at a base station from which the correction factor(s) is received. In other words, receivers in relatively close proximity to one another should experience similar changes. Therefore, data exchanged between receivers should indicate similar biases. An anomaly may be indicative of one receiver being attacked by spoofed signals. If undetected, such an attack may result in corrupting a receiver's determined time, position, etc.

In response to detecting a spoofing attack, a receiver equipped with both GNSS and LORAN functionality may default to data associated with the other modality (e.g., the one that is still believed to be trustworthy). This is possible because the post correlation power and SNR is independent of the AGC value (i.e., AGC monitoring can occur independent of signal processing, so a receiver can monitor AGC and if determined to be unacceptable, may disregard the signal for PNT solution calculations).

Furthermore, in the event of a spoofing attack, rather than switching over to an alternate modality a receiver with high enough sensitivity may use logic to assign a preference to a weaker, earlier-arriving signal over a stronger but later-arriving signal. In GNSS, this may be a signal arriving in the same Doppler bin. In this regard, spoofing attacks can be detected and thwarted by disregarding the stronger signal which likely indicates a spoofer is increasing signal amplitude to steer the receiver away from an authentic signal.

In an embodiment, a multi-mode PNT receiver may monitor a relationship between data maintained by one modality and data maintained by another modality. A divergence from historical differences between the data sets may indicate a spoofing attack.

Generally, it is likely that there will be a slight difference between data (e.g., position, time, location, etc.) associated with different modalities. For instance, data associated with LORAN signals and data associated with GNSS signals may yield times which are slightly different. Ideally, no such difference would exist. However, any number of factors may cause a discrepancy such as atmospheric conditions, common mode biases, weather, etc. Generally, ASFs vary slowly enough that the differences between modalities may be modeled linearly for short periods of time. In other words, ASFs may be assumed constant over a relatively short time period given the relatively slow rate at which these variables tend to change. Therefore, a sudden change in the relationship between two modalities (e.g., a time calculated from GNSS signals may drift away from a time calculated from LORAN signals) which signifies a departure from historical differences (which may be corrected for ASFs and other variables) may be indicative of a PNT spoofing attack of one modality or the other (assuming that the capability of the spoofer does not include capture and faithful re-broadcast of both GPS and LORAN signals simultaneously).

A divergence in two data sets determined to be indicative of a spoofing attack may trigger a receiver to implement precautionary measures. For example, a receiver may alert authorities (e.g., law enforcement or network administrators). Additionally or alternatively, a two-mode receiver may disregard recently received signals associated with both modalities. This may be necessary because although a receiver may observe a divergence between the two data sets, it may not be able to ascertain which of the modalities has been compromised. Therefore, given the loss of trustworthiness of the signals, the receiver may, for example, enter a holdover mode associated with a presumably authentic time calculated prior to the divergence of the two distinct modality times.

A receiver may also maintain more than two modalities, such that the particular modality being attacked may be isolated. For example, a receiver may maintain a GNSS data set, an open LORAN data set, and a closed LORAN data set (see discussion below regarding open and closed signals). By monitoring data associated with each modality, an outlier may be identified and, in response, data associated with the outlier's modality may be disregarded if it is believed that the outlier is caused by a spoofing attack. Furthermore, as with a two-mode receiver, a multi-mode receiver monitoring three or more modalities may also compare current differences between solutions associated with different modalities against historical values. In this regard, a spoofing attack of two modalities may be detectable given an inherent trustworthiness in one or more modalities. For example, at a given point in time, data associated with closed LORAN signals may correspond to historical values while data associated with GNSS signals and open LORAN signals may drift away from historical values. Such a trend may cause a receiver to determine there is a spoofing attack of the GNSS and open LORAN signals. In turn, the modalities identified as experiencing an attack may be disregarded and the receiver may continue operations with the modality or modalities which have maintained their relationship to historical values.

In yet another embodiment of the present invention, an eLORAN system (or other generation of LORAN) may transmit a secondary signal that has an extremely low probability of intercept ("LPI") due to use of a security regime (e.g., some form of encryption). Such a security regime may be compatible with conventional LORAN-C (the third iteration of LORAN) and newer eLORAN signals and services such that legacy transmitters and receivers may be unaffected and may continue to be utilized without needing additional equipment to accommodate the security regime. A secondary signal utilizing a security regime to prevent spoofing may be referred to as a covert signal.

A security regime may comprise encrypted data, a pseudo-randomly generated offset time relative to an open LORAN burst, or both. Through secure receivers' (i.e., those equipped to utilize covert signals) use of covert signals from LORAN stations, the proposed system and/or method may break down an inherent weakness of spoofing (e.g., manipulation of an open signal). The proposed method of using covert signals may deny malicious spoofers critical access to at least one signal used by secure receivers (i.e., a covert signal) and thus may reduce the success of spoofing attacks. Further, receipt of covert signals may provide a trustworthy continuing data set so that a secure receiver's operation is uninterrupted in the event open LORAN signals are spoofed. In other words, sensing a divergence between its open and covert data sets may cause a secure receiver to default to the secure covert data and/or provide an alert (e.g., via back-channel network facilities) to a central network management entity.

As mentioned above, in an embodiment of the present invention a security regime may comprise encrypting data in a covert signal. In other words, traditional eLORAN may be hardened by adding an extra burst or burst-pairs which encode additional data beyond that typically included in standard, or "open," eLORAN signals. For example, the additional data may be time reference data duplicative of, or supplemental to, eLORAN's open signal time reference data. Because, standard eLORAN uses a relatively small percentage of its power and bandwidth to transmit open signals (e.g., traditional public and unencrypted signals) there remains ample transmission capacity to accommodate covert signals alongside the open signals. It is estimated that eLORAN systems use only about 3-10% of available transmission time to transmit open signals, thus it may be possible to use existing resources (e.g., LORAN stations) to modulate and transmit a covert signal containing encrypted data.

Each eLORAN station may be assigned a unique set of encryption keys used for securing data in covert signals. Secure receivers may receive corresponding encryption keys through a back-channel such as an internet data connection. In this regard, data transmitted in covert signals may be encrypted before transmission such that spoofers may be unable to decipher the data. A signal, or a portion thereof, which is encrypted and therefore usable only by secure receivers may be referred to as "closed." Without access to the respective encryption key, spoofers may be prevented from generating replica closed signals which could be used to confuse secure receivers. That is to say, because spoofers may be unable to properly encrypt replica signals, secure receivers may recognize spoofed covert signals based upon an inability to properly decrypt the signals using the respective encryption key. Therefore covert signals may be associated with a time and/or location having increased trustworthiness at secure receivers. Notably, unsecure receivers (i.e., those without the encryption keys) may remain vulnerable to spoofing attacks given their inability to interpret and utilize covert signals.

In another aspect, a pseudo-random offset timing regime may be utilized to establish a series of offset times related to the transmission of open eLORAN signals and covert signals. That is to say, the time which elapses between transmission of standard eLORAN bursts (i.e., open signal) and transmission of a closed signal (i.e., covert signal) may fluctuate in accordance with a security regime. Knowledge of such a pseudo-random offset timing regime may be passed to a secure receiver via a back-channel. In accordance with the regime, a secure receiver may have advanced knowledge of when a covert signal is to be transmitted with respect to the open signal immediately preceding it. In this regard, should the covert signal fail to arrive at the receiver at the appropriate time, the receiver may determine the signal to be a spoofed replica. This is because without a secure receiver, spoofers will not have access to the pseudo-random offset timing regime. Without knowledge of the regime, spoofers may be unaware of how long to delay transmission of a covert signal in relation to an open signal in order to capture a receiver. If the time offset of a covert signal trailing an open signal is randomly generated at the transmitter, and the time offset with respect to the last open signal burst is known only to secure receivers (by cryptography), the covert signal may be virtually impossible to spoof. This, in turn, may ensure trustworthiness of the potentially more precise GPS or GNSS signals received at multi-mode secure receivers if data generated using the GNSS signals matches or corresponds to data generated using secure covert signals.

Initially, the receiver time used to generate pseudo-random offset timings, a kind of time or phase hopping, can be generated from either GNSS or open eLORAN signals. Once sufficient SNR is recovered, covert signal bursts may be tracked independently from open eLORAN bursts (it should be appreciated that covert signals may also add link margin to enable receivers to continue to operate in the presence of greater loss between a transmitter and a receiver). Thus, if a bad actor were able to spoof (or jam) the open eLORAN signals, a secure receiver may detect and report an unusual bias or discrepancy between the open signal data and the closed signal data. For example, an unusual difference between a time generated from open signals and an independent time generated from closed signals may be identified. This is advantageous because it may provide a positive indication of an active spoofing attack which is useful for switching to an alternate modality, generating internal network alerts, recording enforcement evidence, or for promptly notifying authorities of an attack. Even if open signals are determined to be spoofed, a secure receiver may be able to continue PNT processing using only data received via covert signals because they may be considered trustworthy given their data encryption and/or secure offset timing.

Because a malicious party intent on spoofing would likely not know or be able to determine when to detect or re-broadcast covert signal bursts, they may be left with only the option of jamming the entire 100 ms eLORAN Ground Repetition Interval ("GM"). While possible, this may leave such a party vulnerable to detection by authorities. Moreover an extended transmission time requires that the spoofing transmitter be on for a longer time which will create heat beyond the normal eLORAN heating and may be very expensive or difficult to build. In any case, even jamming may not render a secure receiver untrustworthy because a receiver, once disrupted, may cease PNT processing and provide an alert to the receiver's user, for example. In this regard, even though a receiver may stop functioning, this may be a preferred alternative to the receiver continuing to operate but with false information being incorporated into time and location solutions without the user's knowledge.

Although applicable to all GPS, GNSS, and eLORAN receivers, aspects of the present invention may be particularly applicable to indoor eLORAN receivers used in fixed locations, for example, for timing purposes. Such receivers may regularly receive radio signals which are excessively weak such that receivers may need to integrate incoming signals over several bursts to develop an acceptable SNR. Integrating covert signals correctly over several cycles may be almost impossible without a priori knowledge of the pseudo-random offset timing regime which of itself is an encryption. Such offset times may be disseminated over a separate communication channel (e.g., wireline internet connection or a wireless data network) in an encrypted format to allow a secure receiver to properly demodulate the covert signals or the decryption key may be transmitted after being encrypted by a master encryption. By having knowledge of the offset times or decryption key, a secure receiver may be able to integrate successive covert signals to improve SNR whereas an unsecure receiver without knowledge of the pseudo-random offset timing regime may perceive the covert signals as noise and be unable to integrate them.

It is important to note that although a security regime as discussed herein is directly applicable to securing eLORAN signals, such a security regime may be utilized to improve security in other PNT systems as well. For example, a multi-mode secure receiver may maintain data based on open eLORAN signals, data based on closed eLORAN signals, and data based on GNSS signals. Although the security regime is implemented in the eLORAN signals, a receiver may be able to detect a GNSS spoofing attack by monitoring a relationship between the secure closed signal data and the GNSS data. An anomaly in the data which is uncharacteristic of then-present conditions may be assumed to be caused by a spoofing attack. In this regard, GNSS users may attribute additional trust to GNSS signals providing a PNT solution which properly corresponds to a PNT solution calculated from the secure closed signals.

Further still, while it may be appreciated that the foregoing may assume a stationary PNT receiver location, other embodiments may be provided in which the PNT receiver is moving. In such instances, if a moving platform for the PNT receiver may keep track of its location (e.g., via inertial, holonomic, or other appropriate constraints), then any of the foregoing considerations may still be used within the confines of accuracy of the navigation method used. Accordingly, the foregoing aspects and embodiments may be used in the context of a stationary receiver. Furthermore, the foregoing aspects and embodiments may also be used in the context of a receiver in motion without loss of functionality. In the context of a receiver in motion, so long as the receiver may track the location of the receiver with appropriate constraints, the methodology discussed herein may equally be utilized with proper considerations provided to the constrained motion tracking.

DETAILED DESCRIPTION

While this disclosure is susceptible to various modifications and alternative forms, specific embodiments thereof have been shown by way of example in the drawings and are herein described in detail. It should be understood, however, that it is not intended to limit the disclosure to the particular form disclosed, but rather, the disclosure is to cover all modifications, equivalents, and alternatives falling within the scope as defined by the claims.

Figure 1:
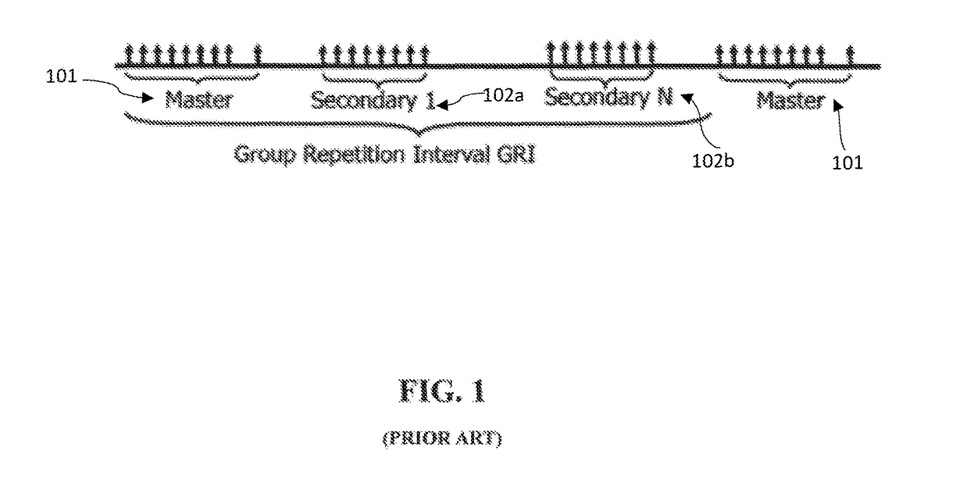
FIG. 1 illustrates a traditional eLORAN pulse sequence.

FIG. 1 illustrates a traditional (i.e., open) eLORAN pulse sequence 100. The burst sequence 101 transmitted from a master station comprises nine pulses while sequences 102a, 102b transmitted by secondary stations comprise eight pulses. The pulses within a burst are spaced about 1 ms apart. Generally, the GM of eLORAN is about 100 ms. That is, the whole train of bursts from all stations in a chain repeat transmissions every 100 ms. In other words, the beginning of a burst from the master station will occur 100 ms after the beginning of the previous burst from the master station. Notably, the open signals occupy less than 10 percent of the GM, leaving ample capacity for inserting additional bursts, for example, covert signal bursts as described above.

Figure 2:
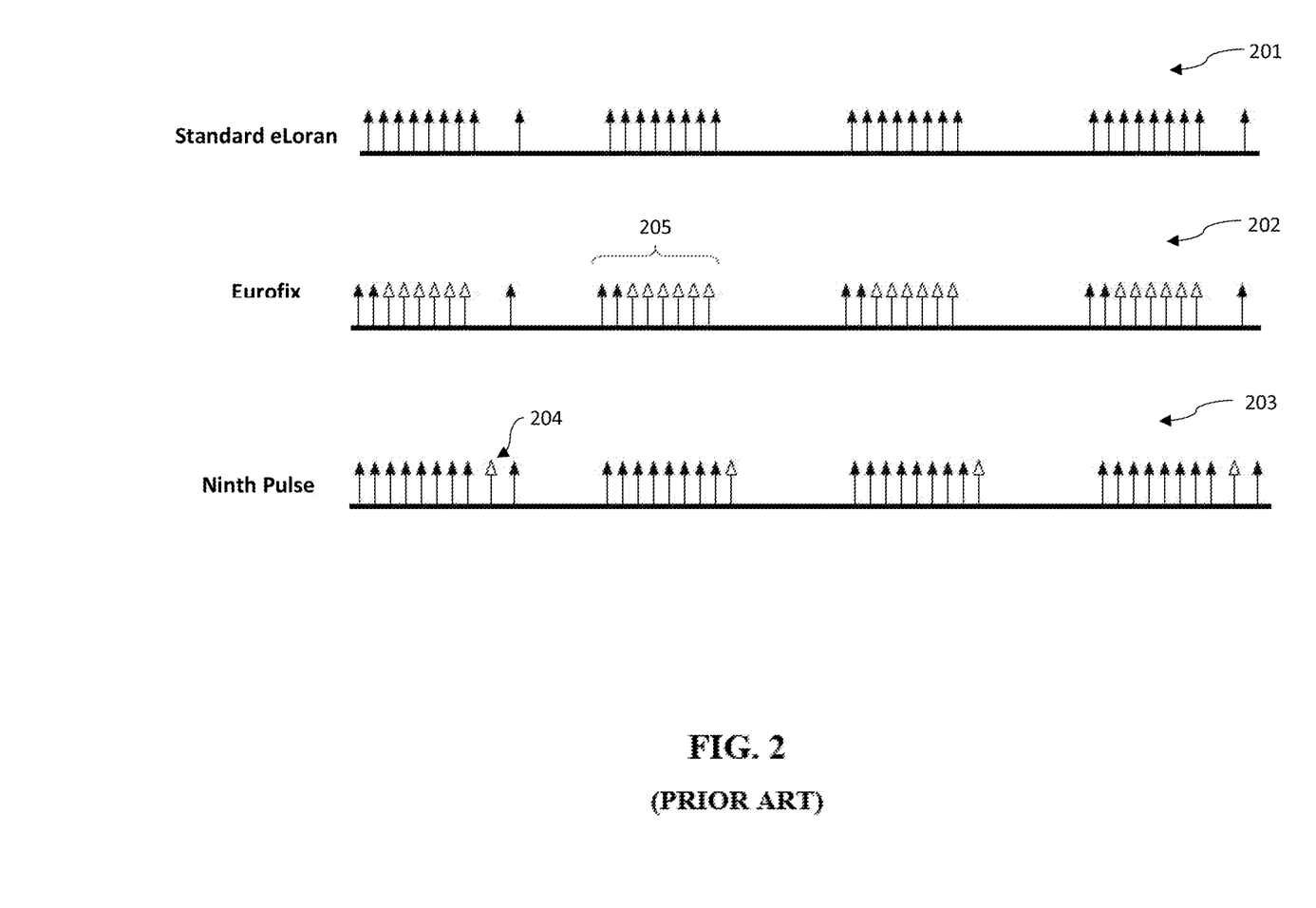
FIG. 2 illustrates known methods used in eLORAN applications for incorporating additional data into a standard signal.

Existing eLORAN systems have experimented with adding data to traditional LORAN pulses 201 through various methods, some of which are illustrated in FIG. 2. For example, in the Ninth Pulse model 203, a LORAN Data Channel ("LDC") (e.g., a side channel) may be created by adding an extra pulse 204 to the burst from each station (e.g., a $10^{th}$ burst from the master station and a $9^{th}$ burst from secondary stations). Each additional pulse may take on one of 32 possible states ranging from 0 to 157.75 μs. Alternatively, as in the Eurofix model 202, each of the last six pulses in time 205 may be modulated by +1, 0, or −1 μs (pulse position modulation). In this regard, each of six pulses from each station may have one of three states (early, prompt, or late).

Figure 3:
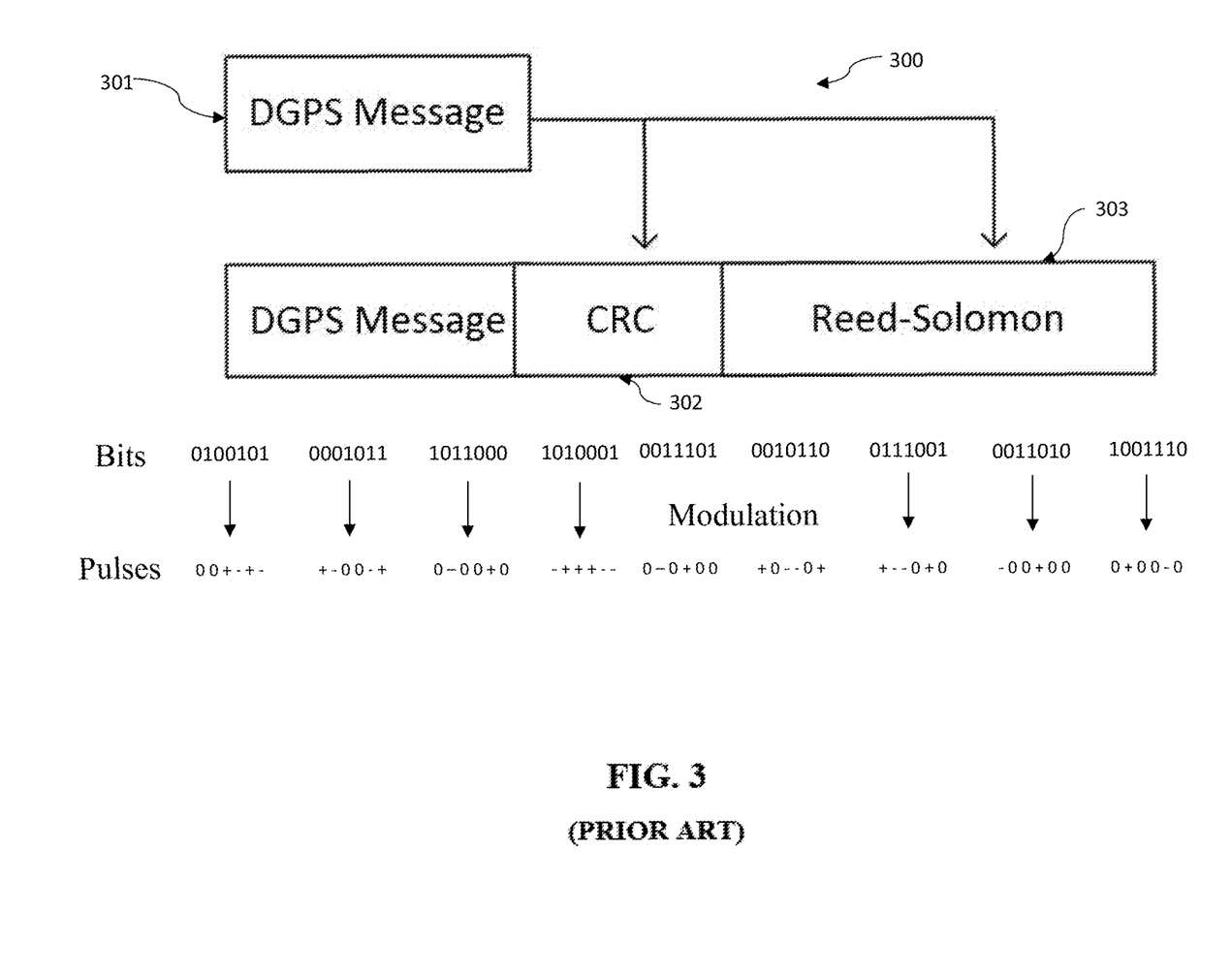
FIG. 3 illustrates a method of mapping differential GPS data to modulated pulses of a LORAN data channel.

The Eurofix method may be utilized for transmission of application data such as differential GPS information as shown in the method 300 of FIG. 3. The transmission of a 56-bit differential GPS message 301 with 14-bit cyclic redundancy check 302 includes forware error correction using a 140-bit Reed-Solomon parity 303. Regardless of which method is used, an LDC may carry relevant information such as differential eLORAN correction, UTC time of day and date information, eLORAN integrity information, differential GPS information ("DGPS"), GPS integrity information, etc.

Figure 4:
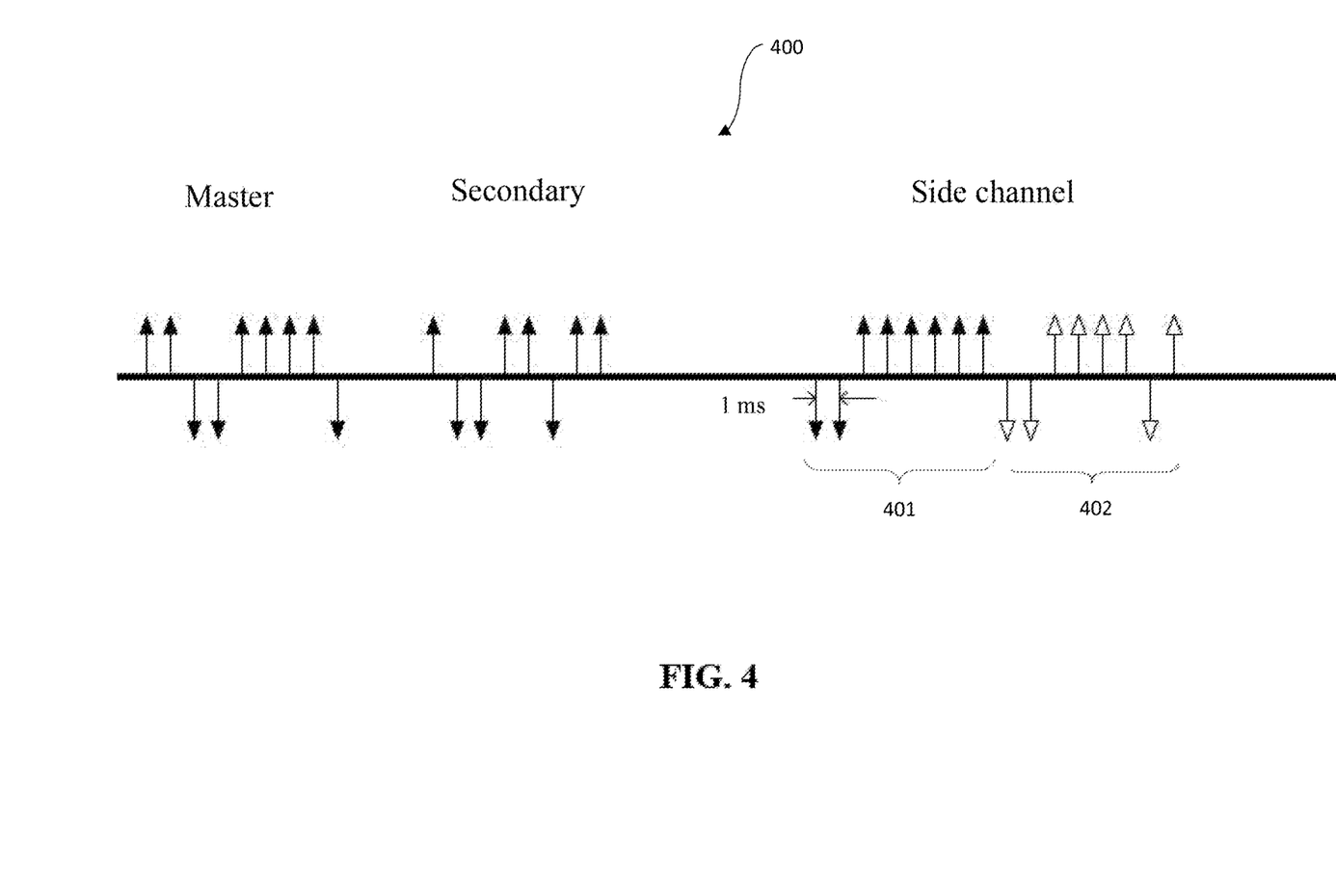
FIG. 4 illustrates an exemplary covert signal in accordance with an embodiment of the present disclosure.

An exemplary covert signal is illustrated in FIG. 4. In an aspect of the present invention, a covert signal 400 may be added that is encrypted and transmitted within the unused transmission time during the 100 ms ground repetition interval. As shown, a covert signal 400 may comprise an encrypted preamble 401 and encrypted data 402. An encrypted preamble 401 may be used solely for authentication of the signal or may convey additional data as well. The transmission of a covert signal 400 may occur at a standard position within each GRI (e.g., 40 ms into the GRI) or may follow a pseudo-random offset timing regime as discussed above. Notably, preamble 401 and encrypted data 402 are illustrated as each comprising eight pulses but it should be appreciated that they may comprise any suitable number of pulses.

Figure 5:
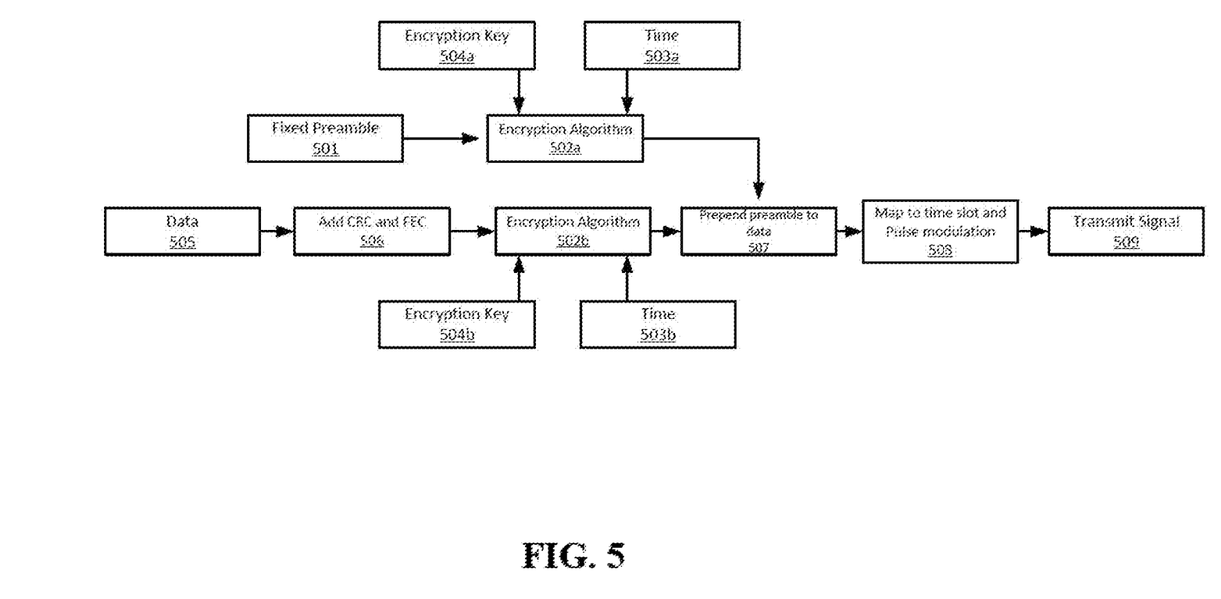
FIG. 5 illustrates a method of modulating an encrypted covert signal at a transmitter.
Figure 6:
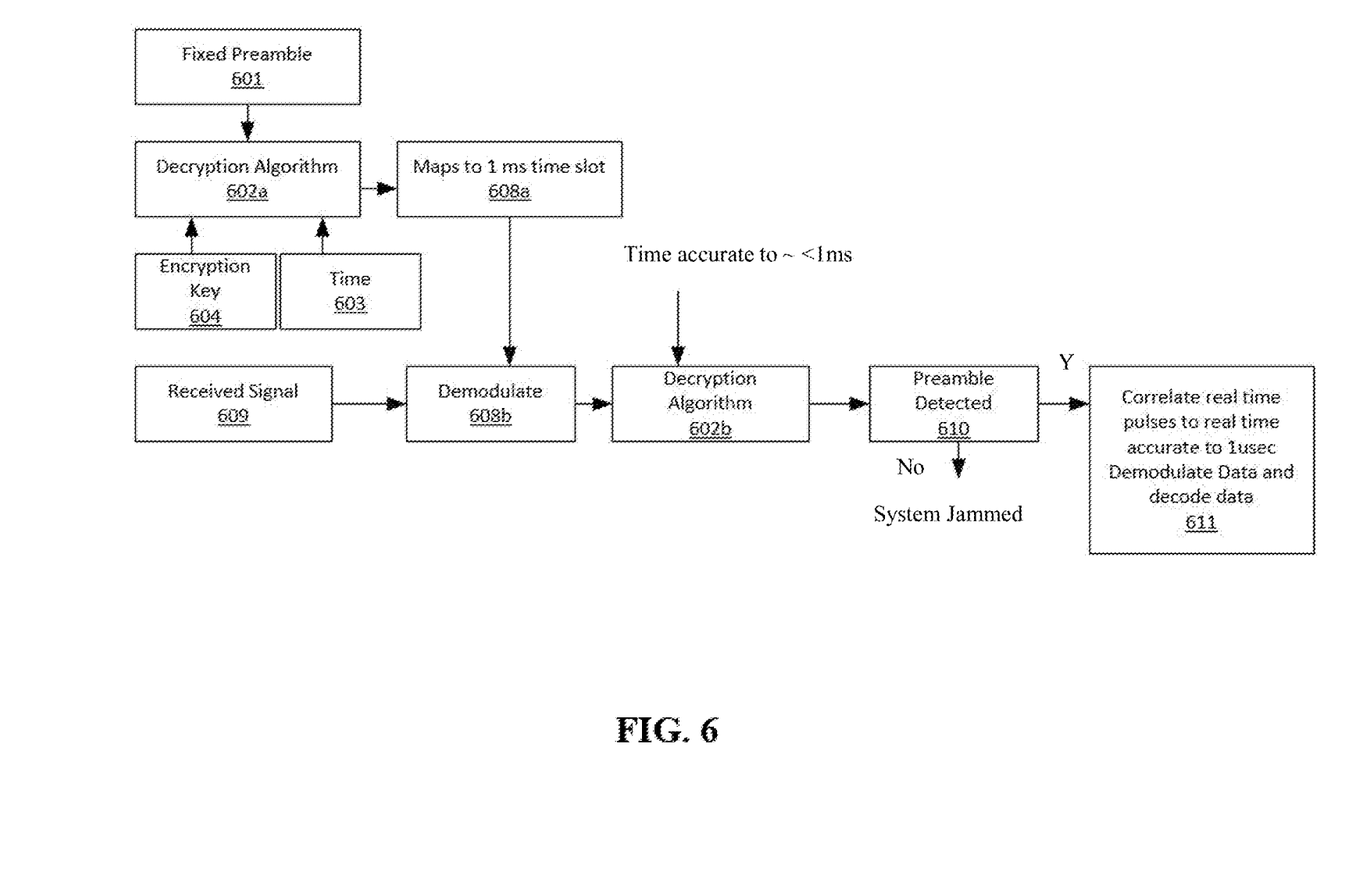
FIG. 6 illustrates an exemplary method of decrypting a covert signal at a secure receiver.

FIG. 5 illustrates a method 500 of modulating an encrypted covert signal at a transmitter. A fixed preamble 501 is processed with an encryption algorithm 502a which incorporates a time 503a and an encryption key 504a. This step may assign a pseudo-random offset time to the preamble 501. The preamble 501 may be used for validation of the covert signal at a receiver. It may also be effective for transferring time to a receiver at an arbitrarily determined time precision (e.g., 1 µs as shown in FIG. 6). Data (e.g., DGPS data) 505 is combined with a cyclic redundancy checksum and frame error checksum 506. Then, similar to the preamble 501, the data 505 is processed with an encryption algorithm 502b (may or may not use the same encryption algorithm 502a, encryption key 504a, or time 503a as the preamble 501). The preamble 501 and data 505 are then combined 507 before being mapped to a time slot and modulated 508. In conformance with existing transmitters, covert signal bursts (which may be a single pulse or a sequence of pulses) may follow a standard modulation process of emitting a teardrop pulse (or an acceptable waveform variant) sequence wherein each pulse transmission has an approximately 10 µs pulse width time. It should be noted the described method is just one example of processing for a covert signal and is not limiting. Any known appropriate method of encryption, mapping, or modulation may be used.

FIG. 6 illustrates an exemplary method 600 of decrypting a covert signal 609 (e.g., transmitted covert signal 509 of FIG. 5) at a secure receiver. The receiver may have advanced knowledge (via a back-channel) of a fixed preamble 601 and encryption key(s) 604. This information may be fed into a decryption algorithm 602, along with a time 603, before being mapped 608a to a time slot. When a signal 609 is received, it may be demodulated 608b using this information. The signal 609 may then be fed into a decryption algorithm 602b for analysis 610 of the encrypted preamble. In the absence of a preamble, the covert signal 609 may be determined to be spoofed. If a preamble is present, real time pulses are correlated 611 to a time accurate to 1 µs and the data may be demodulated and decoded.

Figure 7:
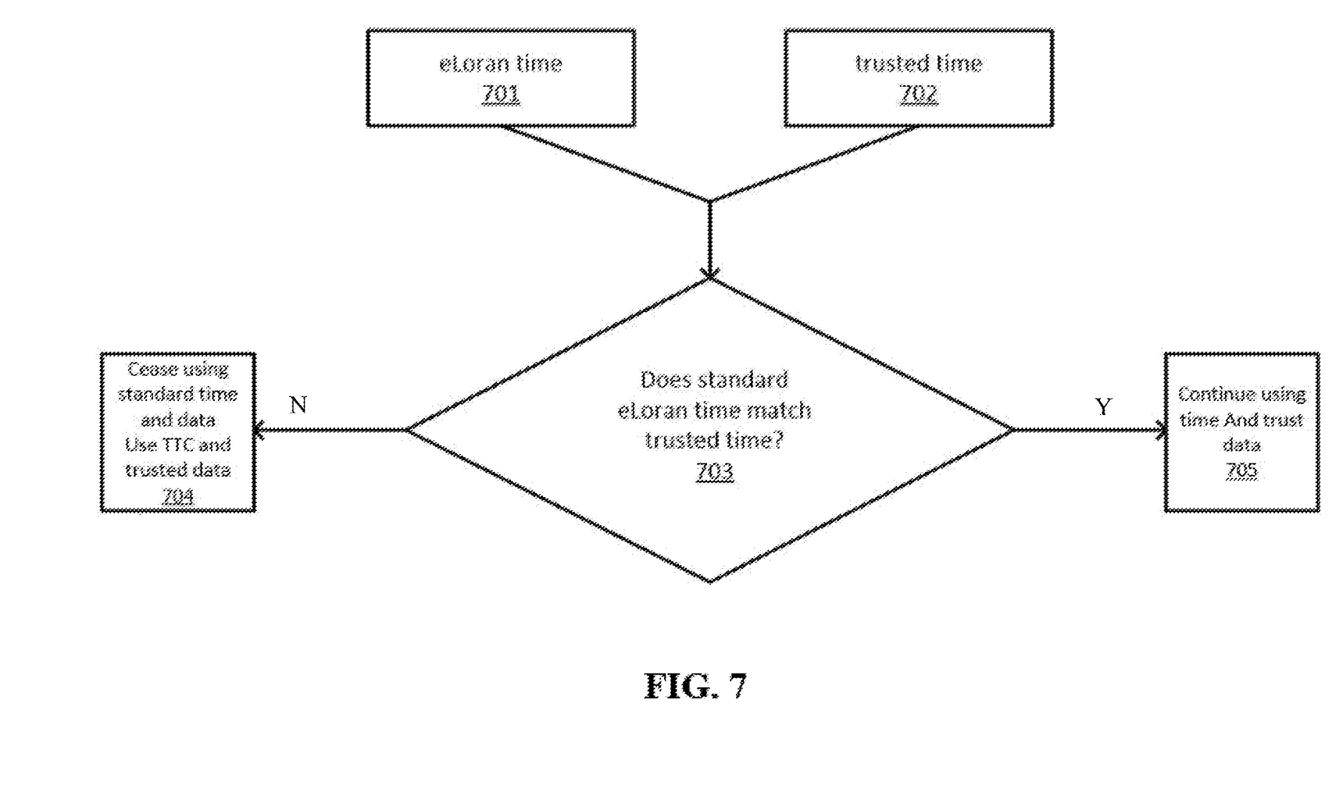
FIG. 7 illustrates a method of using covert signals to verify data and an associated time.

FIG. 7 illustrates a method 700 of using covert signals to verify data and an associated time. An eLoran time 701 may be generated using open LORAN signals and a trusted time 702 may be generated using covert signals. These two times may be compared 703 to verify that they match. Notably, the times may "match" even if different, so long as a relationship between the two times corresponds to observed historical differences. If the times do not match 704, a secure receiver may cease using open signals and instead default to only using the coverts signals. If the times do match 705, the receiver may continue using the open signals appropriately.

While the foregoing has illustrated and described several embodiments in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only a preferred embodiment and variants thereof have been shown and described and that all changes and modifications that come within the spirit of the disclosure are desired to be protected.

What is claimed is:

1. A method for verifying authenticity of radio navigation signals, comprising:
   storing, at a secure receiver, information regarding a pseudo-random offset timing regime comprising a covert offset time, wherein the covert offset time corresponds to a delay between transmission of a first open radio navigation signal and transmission of a first closed radio navigation signal;
   transmitting the first open radio navigation signal and the first closed radio navigation signal from a LORAN transmitter chain utilizing the covert offset time;
   receiving, at the secure receiver, a first received open radio navigation signal.

2. The method of claim 1, further comprising:
   receiving, at the secure receiver, a first received closed radio navigation signal;
   calculating a received offset time comprising a relationship between a time of receipt of the first received open radio navigation signal and a time of receipt of the first received closed radio navigation signal; and
   comparing the received offset time with the covert offset time to determine authenticity of the first received open radio navigation signal.

3. The method of claim 2, further comprising:
   determining from the comparing that a PNT signal comprising the first received open radio navigation signal and first received closed radio navigation signal is authentic as a function of the covert offset time corresponding to the received offset time.

4. The method of claim 3, wherein the first received closed radio navigation signal conveys data to the secure receiver useful for calculating at least one of position, navigation, or time.

5. The method of claim 4, further comprising:
   encrypting, at a transmitter, the pseudo-random offset timing regime; and
   decrypting, at the secure receiver, the pseudo-random offset timing regime.

6. The method of claim 5, wherein the pseudo-random offset timing regime further comprises a second offset time which is different than the first offset time and corresponds to a delay between transmission of a second open radio navigation signal and transmission of a second closed radio navigation signal; and
   the method further comprises:
      receiving, at the secure receiver, a second received open radio navigation signal and second received closed radio navigation signal;
      calculating a second received offset time corresponding to reception of the second received open radio navigation signal and reception of the second received closed radio navigation signal; and
         comparing the second offset time to the second received offset time.

7. The method of claim 1, further comprising:
determining that a PNT signal comprising the first received open radio navigation signal is spoofed based on the PNT signal being deficient of a closed radio navigation signal.

8. The method of claim 7, further comprising:
entering a holdover mode in which a local clock is maintained in accordance with a time calculated prior to receipt of the first received open radio navigation signal.

9. The method of claim 1, wherein the pseudo-random offset timing regime is received at the secure receiver via a secondary channel which is different than a radio communication channel on which open radio navigation signals or closed radio navigation signals are transmitted, wherein the secondary channel is an internet-accessible wired or wireless network connection.

* * * * *